United States Patent [19]

Gildersleeve, Jr. et al.

[11] 4,038,557
[45] July 26, 1977

[54] PARTICULATE ENERGY ABSORBER

[76] Inventors: Oliver DeP. Gildersleeve, Jr., 109 Deepdale Road, Strafford, Pa. 19087; George A. Hunger, Jr., 410 W. Palmer St., Morrisville, Pa. 19067

[21] Appl. No.: 549,152

[22] Filed: Feb. 12, 1975

[51] Int. Cl.$^2$ .......................... H02P 9/04; G02B 5/10
[52] U.S. Cl. .............................. 290/1 R; 159/DIG. 3; 60/203; 60/641
[58] Field of Search ................ 290/1, 2; 159/DIG. 3, 159/4 K, 24 A; 60/641, 203

[56] References Cited

U.S. PATENT DOCUMENTS

| 2,968,916 | 1/1961 | Taylor et al. | 60/641 |
| 2,969,637 | 1/1961 | Rowekamp | 60/641 |
| 3,083,528 | 4/1963 | Brown | 60/203 |
| 3,203,167 | 8/1965 | Green, Jr. | 60/641 |
| 3,287,910 | 11/1966 | Silverstein | 60/203 |
| 3,866,332 | 2/1975 | Hertz | 159/DIG. 3 |
| 3,892,433 | 7/1975 | Blake | 290/2 |

Primary Examiner—Robert S. Macon
Attorney, Agent, or Firm—Paul & Paul

[57] ABSTRACT

Radiant energy is converted to thermal energy utilizing forced convection through a fluidized bed. The bed is made up of solid, radiant energy absorbing solids in particulate form, which are maintained in fluidized condition by passage of a gas therethrough. Radiant energy impinges upon and is absorbed by the bed, and in turn is transferred thermally to the gas. The gas may be utilized to drive a gas turbine power generator, may be reacted chemically with the particulate solids or the like.

24 Claims, 5 Drawing Figures

PARTICULATE ENERGY ABSORBER

BACKGROUND OF THE INVENTION

This invention relates to apparatus and methods for energy conversion, and more particularly to effective methods for utilizing radiant energy.

Daily, the need is accentuated for cheap, reliable, and plentiful energy sources which minimize adverse environmental effects. For example, fossil fuels currently are in critical supply, due largely to political and strategic conflicts. However, even if these problems should be overcome, mining of fossil fuels generally involves ecological risk, and furthermore the supply of such fuels is finite. Nuclear power is favored by many, but others fear accidents involving radioactive materials, problems relating to disposal of radioactive waste, and adverse environmental effects believed to result from the thermodynamics of nuclear generators.

To many, solar energy presents an ideal solution to the problems engendered from fossil fuel or nuclear energy production, in that it is free and relatively constant, and will continue to be available for the foreseeable future. Therefore, substantial efforts currently are being expended to develop effective radiant energy heat exchangers. For example, in the September 1974 issue of *Mechanical Engineering*, there is an article by A. F. Hildebrandt and L. L. Vant-Hull entitled "A Tower Top Focus Solar Energy Collector," which sets forth a heliostat system whereby mirrors are arrayed around a tower, at the top of which their focused reflection of incident solar energy is received by a boiler. That article is representative of the extensive industrial and academic efforts being allocated to solar energy conversion, under both private and government funding.

The most crucial link in the solar energy absorption and conversion process is of course the basic absorber. That is, it is vital that the absorber mechanism be capable of receiving substantially all of the incident energy, and transferring it without extensive loss to a useful thermal carrier. Heretofore, the more successful ventures have involved focusing the solar energy onto tubes of high thermal conductivity, through which thermal energy absorbing liquids such as water are passed. The water in turn may be utilized under suitable pressure for operation of a steam turbine, or the like. All such designs to date, however, are understood to involve such costs as to render them economically unfeasible. It is accordingly an object of the present invention to provide radiant energy absorption and exchange means, and methods, which improve on the overall efficiency of the process. It is a further object that, in applications of the solar energy so captured, energy-costly exchanges be kept to a relative minimum. Furthermore, adaptability to plural uses, such as promotion of chemical reactions, process heating systems, and the like, is extremely desirable.

SUMMARY OF THE INVENTION

The present invention involves radiant to thermal energy exchange by using a fluidized bed of solid particulate matter. The solid particles, chosen for their radiant and thermal energy exchange properties, are suspended in a chamber in a fluidized bed condition by a gas which possesses a high heat transfer coefficient with the particles. Radiant energy is coupled to the fluidized bed, and the three dimensional movement of the particles presents a relatively uniform thermal profile to the gas which is passing through the particles as it maintains them in a fluidized condition. As the temperature of the particles increases, they conduct heat to passing gas, which is drawn off for use, as desired.

In one illustrative embodiment, the particles and gas are substantially nonreactive with one another, and a gas, under appropriate pressure constraints, is utilized to drive a gas turbine, which turns a power generator. In another application, the solids and gas are chemically reactive under relatively high heat conditions, and the reaction which consequently occurs in the fluidized bed allows for withdrawal of specified byproducts. In still another application, the resulting forced convection system is utilized for industrial process heat supply.

DETAILED DESCRIPTION

Figure 1:
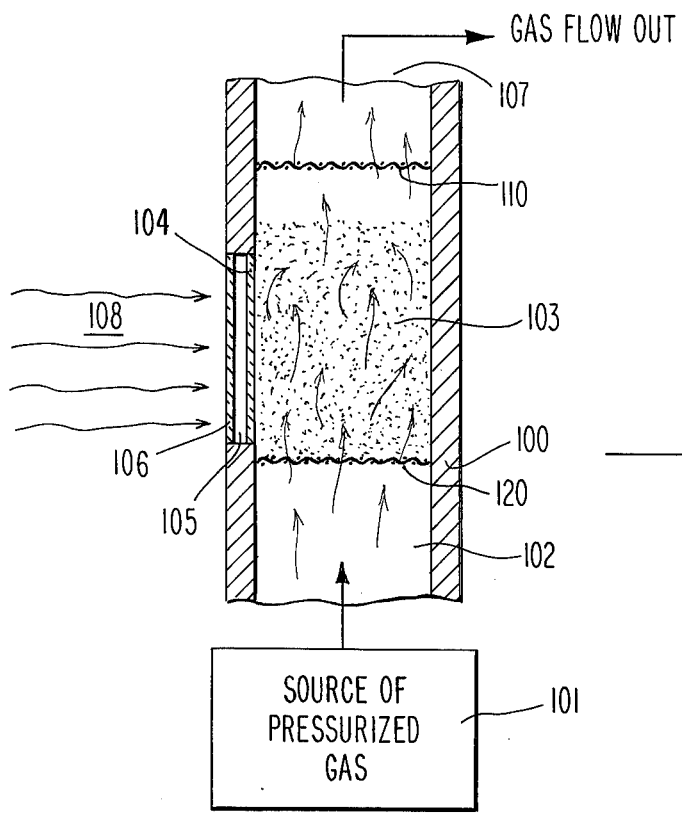
FIG. 1 shows an illustrative embodiment of the principles of the present invention.

In the illustrative embodiment of FIG. 1, a chamber 102 is appropriately formed to enclose a fluidized bed of particles 103, which are maintained in such condition by gas flow from a source of pressurized gas 101. That is, the gas, at a specified flow rate and pressure, is delivered to the chamber 102, and passes through the particles 103 to maintain them in a fluidized bed condition, the physics of which is known, and the gas flows outwardly by an appropriately configured exit 107. The structure 100 which forms the cavity 102 includes a windowed opening for delivering of radiant energy 108 to impinge on the particles 103 of the fluidized bed. As shown, the window includes a pair of glass or quartz windows 104 and 106, spaced appropriately at 105 for purposes of thermal insulation and structural integrity. Alternatively, one or more glass windows may be utilized instead of the dual configurations shown. A screen 120 is shown, which provides support for the particles in the absence of fluid flow. Optionally, filter means 110 may be employed at the egress 107 to prevent migration of the particles through the convection system.

The fluidized bed 103 is made up of solid particulate matter chosen for its radiant and thermal energy exchange properties. Said otherwise, the particulate matter possesses high absorbtivity, or perhaps high absorbtivity and low emissivity depending on application. In particular, the particles of the bed 103 serve to absorb impinging radiant energy 108, and thermally to transfer that energy in a forced convection manner to the pressurized gas from source 101 which also maintains the bed. Therefore, the radiant energy 108 is transformed into thermal energy at the outward flow point 107. The precise size of the particles depends on the fluid mass flow rate available from source 101 to maintain the fluidized bed. The geometry of the bed is not crucial, but advantageously is of sufficient length, depth, and frontal surface such that substantially all the rays 108 impinge upon and are absorbed by particulate matter of the bed 103 during traversal of the bed by the rays, either directly or upon reflection from the walls of the chamber 102. The normal operation of a fluidized bed causes the particles to migrate randomly therethrough, thereby dispersing the absorbed energy rather uniformly through the bed.

Advantageously, the particles of the bed consist of crushed coal, graphite particles, silicon carbide, or other similar materials such as the metallic carbides.

The gas from source 101 is chosen in order to have specified characteristics relative to the particles of the bed 103. Specifically, the gas is transparent, thereby allowing the radiant energy 108 to be absorbed by the particles 103. The gas has a relatively high heat transfer coefficient with the particles. Depending upon the application, the gas is either inert to or chemically compatible in a specified manner with the particles of the bed 103. Finally, also depending upon the application utilized, the gas is selected to involve a workable thermodynamic cycle. Helium, nitrogen, argon and carbon dioxide advantageously are utilized for heat transfer applications of the embodiment of FIG. 1. For chemical reaction purposes, the gas will depend on the desired reaction properties.

The window for coupling radiant energy 108 onto the bed 103 is selected in order to insulate the bed 103 thermally, thereby promoting exchange of heat with the gas from source 101, and further to avoid absorption or reflection of the rays prior to coupling them to the bed 103. Also, of course, the window must be strong enough to withstand the pressure of the gas.

From the foregoing, the following advantages of the present invention may be seen. The three dimensional radiant energy absorption, and the random movement of the particles through the bed will minimize reradiation losses. Judicious selection of particles and gases allows for operation at very high temperatures, and minimal reradiation losses at high temperature operation allows for an increase of the performance of the heat exchanger, thereby rendering the thermodynamic cycle of which the heat exchanger is a component more efficient. Local concentrations or sudden changes in impinging radiant energy will not produce structural stress, due to freedom of motion of the particles in the fluidized bed, yet the exchanger is quick to respond to changes in impinging radiant energy (i.e. it has a low thermal time constant).

Figure 3:
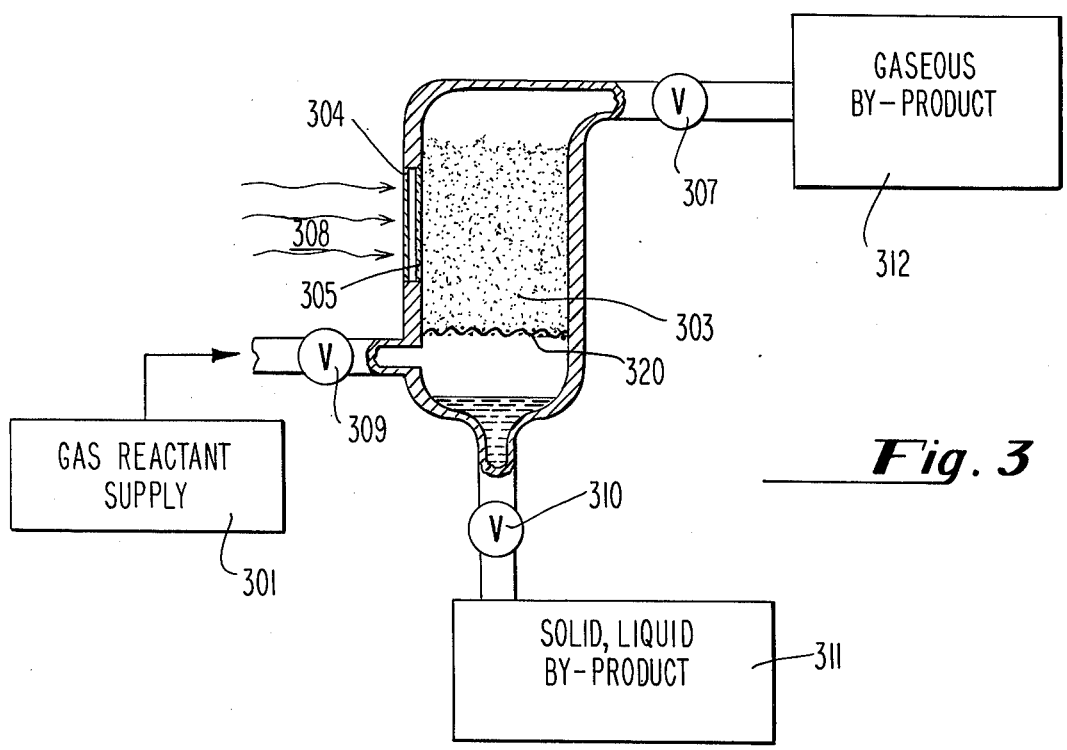
FIG. 3 shows a system wherein the principles of the present invention are adapted to promote chemical reaction.
Figure 2:
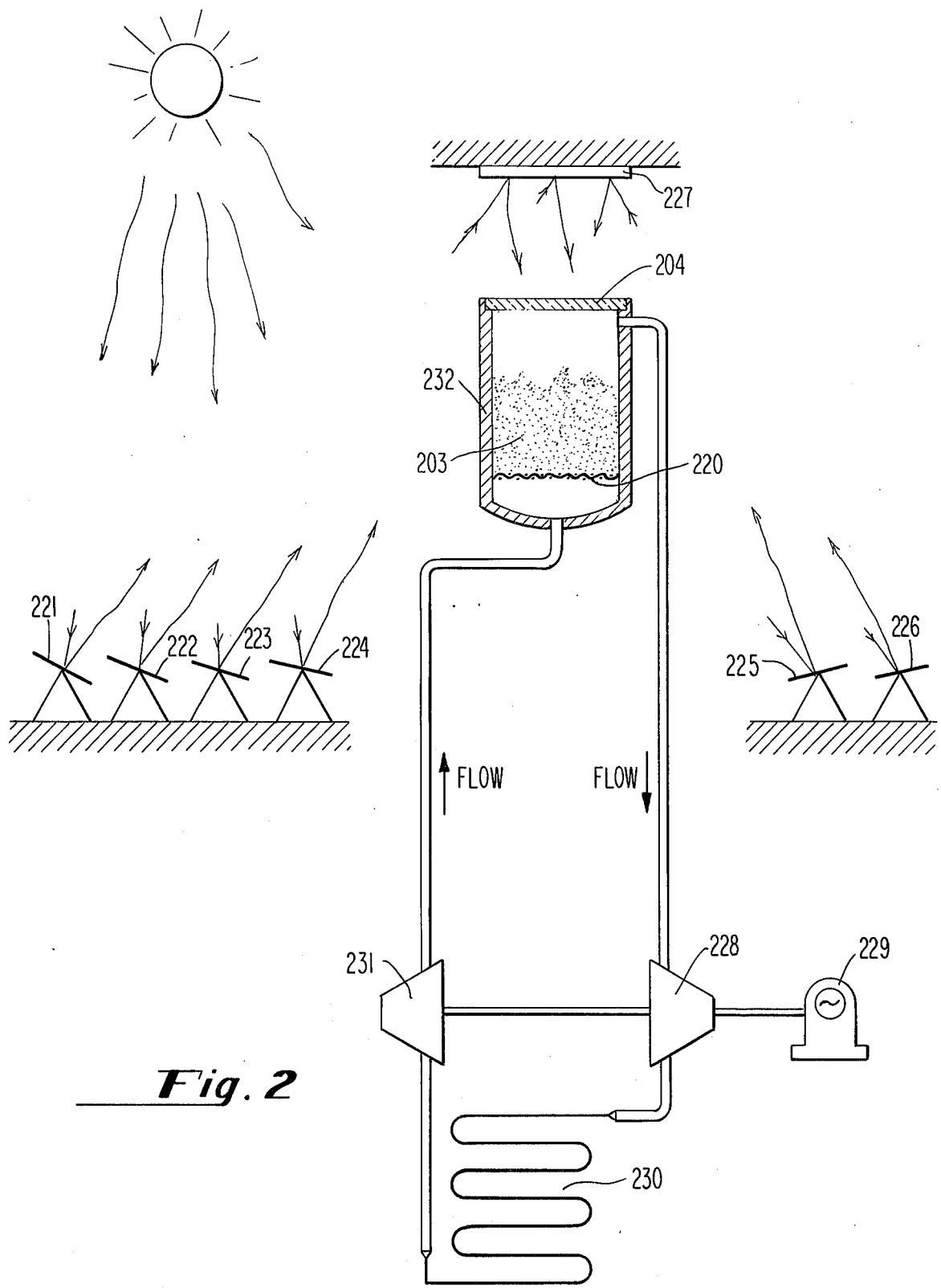
FIG. 2 shows a gas turbine system incorporating the principles of the present invention.
Figure 5:
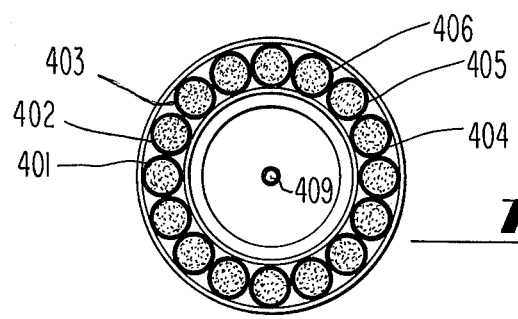
FIGS. 4 and 5 show a gas turbine system employing an alternative embodiment of the present invention.

FIGS. 2 and 3 represent alternative applications for radiant energy absorbers and heat exchangers such as set forth in FIG. 1. In FIG. 2, there is shown a gas turbine system wherein the heated gases from the fluidized bed are utilized directly to drive a gas turbine. Specifically, radiant energy from the sun impinges on a plurality of heliostate mirrors 221 through 226, basically as set forth in the aforementioned Hildebrandt, et al. article. In turn, the rays are directed to a central, suitably mounted aerial receiver mirror 227, and thence to a window 204 of an energy exchanger embodying the principles of the present invention. That is, a chamber 232 is formed wherein gas maintains solid particulate matter 203 in a fluidized bed condition. For the embodiment of FIG. 2, the entire thermodynamic cycle of the gas is utilized, and advantageously it is pressurized in a compresser 231 for introduction into the fluidized bed 203. As in the embodiment of FIG. 1, the gas and particles are chosen to be chemically inert with one another, but to be suitable for radiant and thermal energy exchange. The gases optionally are suitably filtered upon egress from the bed 203 (for simplicity, filter means are not shown), and the heated, pressurized gas is coupled directly to the blades of a turbine 228, which when turned by the hot pressurized gases operates a generator 229. After the energy of the gases is expended over the blades of the turbine 228, the gases are passed through a waste heat exchanger 230, as desired, whereupon they are once more compressed at 231 for re-entry back to the fluidized bed 203 of the exchanger. For the embodiment of FIG. 2, helium gas and graphite particles advantageously constitute the absorber. A support screen 220 is provided beneath the particles for times when gas is not flowing.

An alternative embodiment such as shown in FIG. 3 utilizes the radiant energy 308 to promote chemical reaction within the fluidized bed 303, rather than utilizing the gas and particles as a heat exchanger. That is, the embodiment of FIG. 3 is configured such that one or more gas reactants from supply 301 are utilized at specified pressure and flow rate to maintain a fluidized bed of solid catalytic or reactant particles 303. Valves 307 and 309 control the pressure and flow of gases into and out of the bed 303. Radiant energy 308 impinges on windows 304 and 305, and thereby onto particles of the bed 303, whereupon the heat thereby produced promotes chemical reaction among the gas reactants or between the gas reactants and the fluidized bed particles 303, as desired. Solid or liquid byproducts 311 are removed at valve 310 and gaseous byproducts 312 are removed at valve 307. Essentially, the flow of gas from valve 309 through the bed 303 and out of valve 307 maintains the fluidized bed condition. Again, a support screen 320 functions during times when gas is not flowing.

Figure 4:
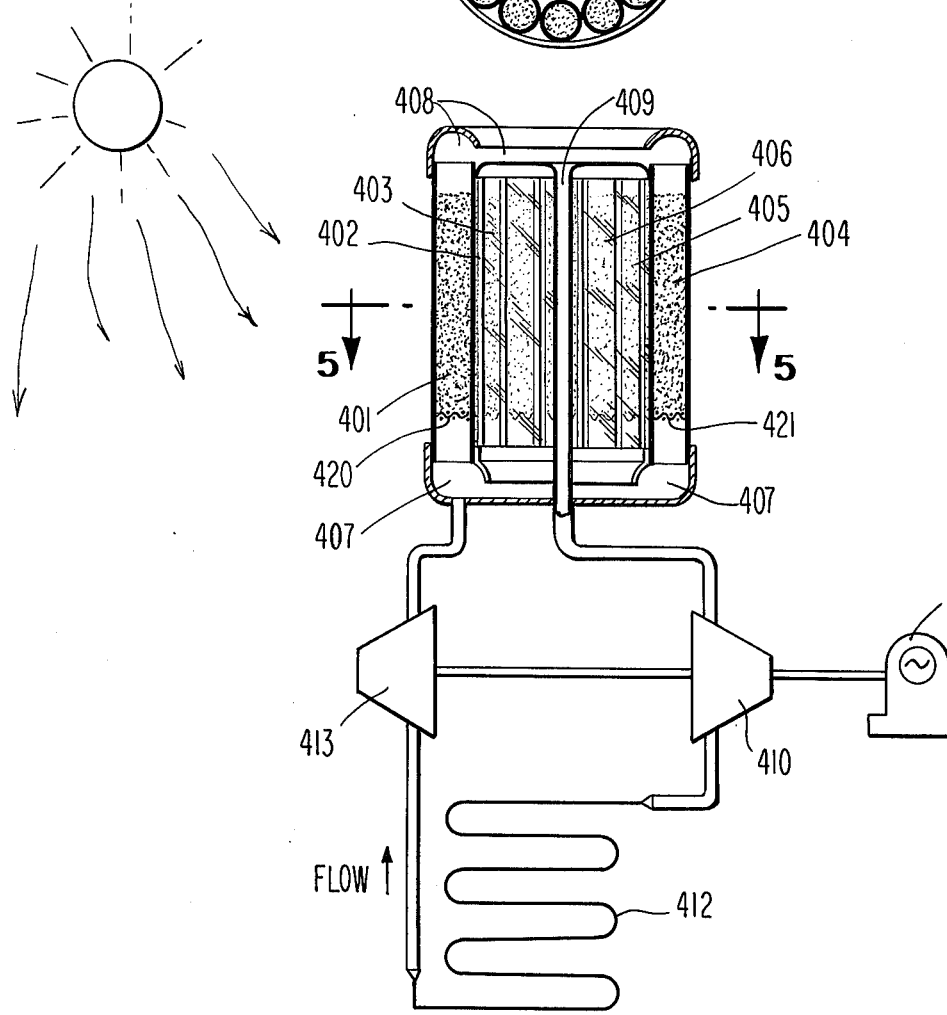
Figure 4:
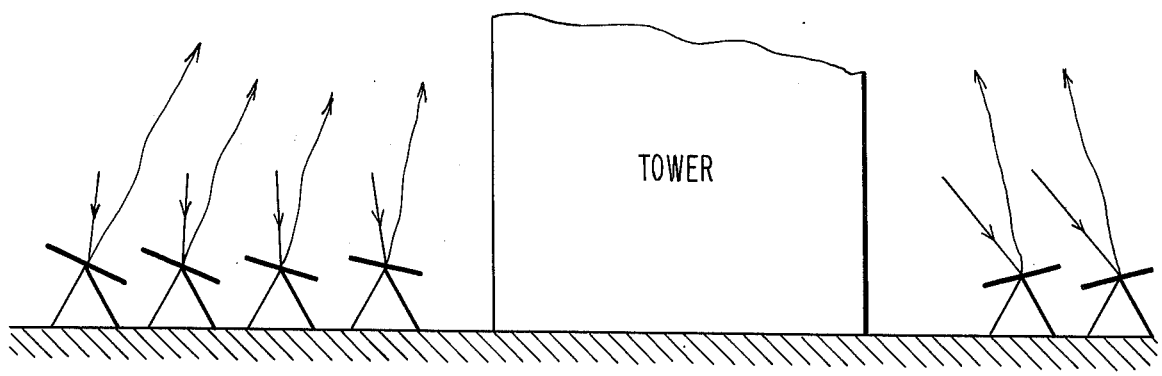

FIG. 4 shows a gas turbine system employing an alternative embodiment of the present invention. In FIG. 4, a heliostat system employing a plurality of appropriately directed pivotal mirrors is utilized, as in the embodiment of FIG. 2. Rather than being directed to a secondary mirror, the plural mirrors focus the radiant energy from the sun directly onto an energy absorber employing the principles of the present invention, which is adapted directly to couple those rays onto the particles of the fluidized bed. Specifically, the absorber of FIG. 1 is suitably mounted at the top of the tower, and includes a plurality of generally upwardly disposed transparent tubes 401 through 406, etc, in each of which is maintained a fluidized bed in accordance with the principles of the present invention. Gas from a compressor 413 is dispersed by means of a low temperature manifold 407 into each of the tubes 401 through 406 and the like, and fluidized bes are maintained in ech of those tubes. Since the tubes themselves are transparent, (preferably single or plural layer glass as set forth hereinbefore in conjunction with the absorber windows), the radiant energy from the pivotal mirrors impinges directly on the particulate matter suspended in a fluidized bed condition within the glass tubes. As set forth hereinbefore, the gas maintains those particles in a fluidized bed condition, and takes thermal energy therefrom. Gas from the various tubes is collected at a high temperature manifold 408, and is coupled downwardly through the interior of the absorber by conduit 409 to a gas turbine 410, which drives the electrical generator 411. Gas from the turbine 410 passes through a waste heat exchanger 412, and thence to a compressor 413 for conveyance as desired to the low temperature manifold 407. Also as set forth in FIG. 2, a conventional mode of operation is to run the turbine 410, the compressor 413, and the generator 411 from the same shaft. Alternatively, of course, the turbine 410 and compressor 413 may be mechanically discrete from one another. Within each of the tubes 401 through 406 and the like, screen such as 420 and 421 are provided for purposes of support of the particles when the system is not being run, and therefore when gas is not being passed through the particles. The totally transparent nature of the absorber structure of FIG. 4 allows rays which may pass through a given tube without being absorbed either to be absorbed at the downward central conduit 409, or to be absorbed in another tube.

It may therefore be noted that in the embodiment of FIG. 2, the absorber may be located anywhere beneath the secondary mirror 227, either in the tower or below it. In the embodiment of FIG. 4, the absorber itself is mounted at the top of the tower for direct incidence of the reflected radiation. While conventionally, a stream turbine is quite large and unwieldy, and therefore is conveniently located on the ground, a gas turbine is smaller and lighter in weight. Thus, the gas turbine could be mounted in the tower to minimize piping requirements. However, such expediencies are design options within the ability of those of ordinary skill in the art.

EXAMPLE

A 2 foot diameter, parabolic mirror with a 9 inch focal length was adjusted to focus sunlight into the center of a vertically positioned, 4 foot long, 2 inch wide square glass tube. In the middle of this glass tube was a screen of small mesh. Positioned a foot and a half above and below the screen were thermocouples. Nitrogen gas from a pressurized tank flowed through the tube, such that the upper thermocouple measured the outlet temperature of the gas, and the lower thermocouple measured the inlet temperature of the gas. Pressure regulators and flows gauges cooperatively functioned to maintain the nitrogen rate at 4 cubic feet per minute.

In a first test, a flat stainless steel plate dimensioned approximately 1¾ buy 6 inches, weighing 174 grams and painted with carbon black paint, was placed on the screen in the tube. Sunlight was focused on the center of the plate, and gas temperatures were measured. In the second test, the plate was replaced by 90 grams of coal particles, which were sized between 16 and 20 mesh. The nitrogen flow rate of four cubic feed per minute was sufficient completely to fluidize coal particles, and the sunlight was focused substantially on the center of the bed. The following table characterizes the data obtained.

| TEST NO. 1 STAINLESS STEEL PLATE-BLACK PAINTED SURFACE | | | | |
|---|---|---|---|---|
| TIME (min) | FLOW (cfm) | T(in) (° C) | T(out) (° C) | ΔT (° C) |
| 0 | 4 | 27.9 | 26.4 | −1.5 |
| 1 | 4 | 25.8 | 27.1 | 1.3 |
| 2 | 4 | 25.0 | 29.1 | 4.1 |
| 3 | 4 | 24.6 | 30.4 | 5.8 |
| 4 | 4 | 23.9 | 31.0 | 7.2 |
| 5 | 4 | 23.7 | 31.9 | 8.2 |
| 6 | 4 | 23.8 | 32.1 | 8.3 |
| 7 | 4 | 23.4 | 32.2 | 8.8 |
| 8 | 4 | 23.3 | 32.6 | 9.3 |
| 9 | 4 | 23.3 | 32.6 | 9.3 |
| 10 | 4 | 23.1 | 23 | PLATE REMOVED |
| TEST NO. 2 COAL PARTICLES 90gms. | | | | |
| 0 | 4 | 30.2 | 30.0 | 0.2 |
| 1 | 4 | 28.7 | 33.2 | 4.5 |
| 2 | 4 | 28.0 | 36.8 | 8.8 |
| 3 | 4 | 28.0 | 38.2 | 10.2 |
| 4 | 4 | 27.1 | 38.3 | 11.2 |
| 5 | 4 | 26.4 | 38.4 | 12.0 |
| 6 | 4 | 25.8 | 38.1 | 12.3 |
| 7 | 4 | 25.2 | 38.1 | 12.9 |
| 8 | 4 | 25.2 | 37.1 | 11.9 |
| 9 | 4 | 24.3 | 37.0 | 12.7 |
| 10 | 4 | 24.2 | 36.5 | 12.3 |

The foregoing has been presented as illustrative of the principles of the present invention. Numerous other alternative embodiments and applications will occur to those of ordinary skill in the art without departure from the spirit or scope thereof.

We claim:
1. Apparatus for converting radiant energy from a specified source to thermal energy comprising:
   a. a housing defining a chamber therein;
   b. a predetermined quantity of solid particulate material in said chamber, capable of absorbing radiant energy;
   c. means for supplying gas to said particulate material at a pressure and rate which suspends said particulate material in a fluidized bed condition within said chamber; and
   d. means for coupling radiant energy to said particulate material while simultaneously maintaining said fluidized bed condition, for absorption of radiant energy by said particulate matter and thermal transfer from said particulate matter to said gas.
2. Apparatus as described in claim 1 wherein said particulate material is characterized by relatively high absorbtivity.
3. Apparatus as described in claim 2 wherein said particulate material is further characterized by relatively low emissivity, and said gas is characterized by a relatively high heat transfer coefficient with said particulate material.
4. Apparatus as described in claim 1 wherein said gas is substantially transparent and nonreactive with said particulate material, and said means for coupling includes at least a portion of the walls of said housing forming said chamber.
5. Apparatus as described in claim 4 wherein the size and quantity of said particulate material and the dimensions of said segment are selected to promote maximum absorption of said energy within said segment.
6. Apparatus as described in claim 4 wherein said portion includes plural layers of glass separated by respective layers of transparent fluid for cooling said glass.
7. Apparatus as described in claim 1 wherein said material is selected from the group consisting of silicon carbide, crushed coal, graphite, and the metallic carbides.
8. Apparatus as described in claim 1 wherein said gas is selected from the group consisting of helium, nitrogen, argon, and carbon dioxide.
9. An electric power generating system comprising:
   a. a housing defining a chamber therein;
   b. a bed of solid particulate material in said chamber, capable of absorbing radiant energy;
   c. a source of gas, said gas being substantially nonreactive with said material, for supplying gases to said chamber and through said materials to maintain a fluidized bed and to be heated by said material;
   d. means for coupling radiant energy to said material while simultaneously maintaining said fluidized bed;
   e. a gas turbine operable by passage of said gas from said fluidized bed at a predetermined pressure over a series of blades thereby expanding energy transferred from said material; and f. an electric generator driven by said turbine.

10. Apparatus as described in claim 9 wherein said particulate material is characterized by relatively high absorbtibity.

11. Apparatus as described in claim 10 wherein said particulate material is further characterized by relatively low emissivity, and said gas is characterized by a relatively high heat transfer coefficient with said particulate material.

12. Apparatus as described in claim 9 wherein said gas is substantially transparent and nonreactive with said particulate material, and said means for coupling includes at least a portion of the walls of said housing forming said chamber.

13. Apparatus as described in claim 12 wherein the size and quantity of said particulate material and the dimensions of said segment are selected to promote maximum absorption of said energy within said segment.

14. Apparatus as described in claim 12 wherein said portion includes plural layers of glass separated by cooling layers of transparent fluid.

15. A system as described in claim 9 adapted for continuous recycling of said gas and further including a waste heat exchanger for cooling gas which has been passed over said blades, wherein said source of gas comprises a compressor for gases from said waste heat exchanger.

16. A method of converting radiant energy to thermal energy comprising the steps of:
   a. providing a predetermined quantity of radiant energy absorptive material in solid particulate form in a housing defining a chamber therein;
   b. passing gases which are substantially nonreactive with said material through said material to maintain a fluidized bed and to exchange heat with said material; and
   c. simultaneously with said passing step, coupling radiant energy to said fluidized bed, whereby the radiant energy is absorbed by said material and is transferred thermally to said gases.

17. A method as described in claim 16 adapted to supply energy to an electric power generation system, further including supplying said heated gas from said fluidized bed at a predetermined pressure to a gas turbine generator system for driving the tubine.

18. A method of promoting a high temperature, controlled environment chemical reaction between specified solid and gaseous reactants comprising the steps of:
   a. reducing said solid reactants to particulate form;
   b. passing said gaseous reactants through the particulate solid reactants, in a suitable enclosure, at a pressure and rate to form a particulate fluidized bed and to exchange heat with said solid reactants;
   c. simultaneously with said step coupling radiant energy onto said fluidized bed; and
   d. withdrawing specified byproducts of said reaction.

19. A forced convection system comprising:
   a. a closed loop gas circulation system including pump means for maintaining gas flow at a predetermined pressure and rate; and
   b. a radiant energy exchanger including a bed of radiant energy absorbing particulate material suspended in a fluidized bed condition in a housing defining a chamber therein, in a sector of said circulation system, by said gas flow, and means for simultaneously coupling radiant energy to said fluidized bed;
   c. whereby radiant energy is absorbed by said particulate material, and thermal energy passes from said particulate material to said gas and thence through said circulation system.

20. Apparatus as described in claim 19 wherein said particulate material is characterized by relatively high absorbtivity.

21. Apparatus as described in claim 20 wherein said particulate material is further characterized by relatively low emissivity, and said gas is characterized by a relatively high heat transfer coefficient with said particulate material.

22. Apparatus as described in claim 19 wherein said gas is substantially transparent and nonreactive with said particulate material, and said means for coupling includes at least a portion of the walls of said housing forming said chamber.

23. Apparatus as described in claim 22 wherein the size and quantity of said particulate material and the dimensions of said segment are selected to promote maximum absorption of said energy with said segment.

24. Apparatus as described in claim 22 wherein said portion includes plural layers of glass separated by cooling layers of transparent gas.

* * * * *